Figure 1:
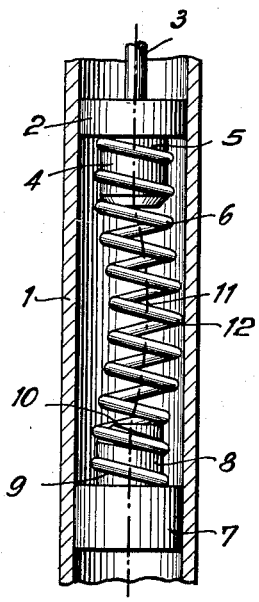

Feb. 7, 1956   F. ALLENDORFF ET AL   2,733,914
SPIRAL SPRINGS AND VIBRATION-DAMPING MEANS THEREFOR
Filed Feb. 24, 1953   2 Sheets-Sheet 1

INVENTORS:
FRIEDRICH ALLENDORFF AND
BY: OTTMAR BAUR

Feb. 7, 1956    F. ALLENDORFF ET AL    2,733,914
SPIRAL SPRINGS AND VIBRATION-DAMPING MEANS THEREFOR
Filed Feb. 24, 1953    2 Sheets-Sheet 2

INVENTORS:
FRIEDRICH ALLENDORFF
AND OTTMAR BAUR
BY:

United States Patent Office 2,733,914
Patented Feb. 7, 1956

2,733,914

SPIRAL SPRINGS AND VIBRATION-DAMPING MEANS THEREFOR

Friedrich Allendorff, Stuttgart, and Ottmar Baur, Wendlingen, Germany, assignors to Robert Bosch GMBH, Stuttgart, Germany Application February 24, 1953, Serial No. 338,312

Claims priority, application Germany February 23, 1952

9 Claims. (Cl. 267—1)

The present invention relates to spiral springs and vibration-damping means therefor, particularly spiral springs such as those used in spring hammer devices and valve springs in internal combustion motors.

An object of the present invention is to provide a spiral spring having a form such that the spring will be in contact with a vibration-damping member adjacent thereto.

It is another object of the present invention to provide a spiral spring device wherein the supporting means of the spring contributes to damping of vibrations in the spring.

It is still another object of the present invention to provide a means for damping the vibration in a spiral spring by varying the effective length of the spring during repeated compression thereof.

In spiral springs of the type mentioned above, the durability of the spring is considerably affected by vibrations set up in the spring while it is being repeatedly compressed, as for example, during the operation of the spring hammer of which it forms a part, or of a valve in a motor housing to which the spring is secured. The frequency of the vibrations thus set up in the spring is substantially higher than the frequency of the repeated compressive force, and as a result stresses are induced in the spring which cause it to break in an unexpectedly short time.

The life of a spiral spring of the type described above is considerably lengthened if such vibrations are reduced or suppressed. The purpose of the present invention is to provide a means for reducing or entirely eliminating the aforementioned vibrations in spiral springs of the above mentioned type which are induced in the springs when they are subjected to repeated and rapid compressive forces, and to achieve those results by a simple yet effective arrangement.

A principal means of damping the vibrations of a spring according to the present invention involves the provision of a spring having a curved form, so that when it is placed near or in contact with an adjacent damping member, the spring when compressed will be in contact with the member, which will consequently damp the vibrations set up therein by the compressive forces exerted thereon.

A contributing means for damping the spring vibrations involves the provision of spring supporting members which are formed of material inherently capable of absorbing vibrations transmitted thereto.

A further contributing means for damping vibrations in a spring according to the invention concerns the particular structure of the supporting members to which the spring is attached, said structure being such as to provide for changing the effective length of the spring during the repeated compression thereof.

With the above objects in view, the present invention mainly consists in a spiral spring arrangement including two spaced spring supports arranged facing each other and each having a center, the centers lying in the supporting axis of the supports, an elongated spiral spring secured between the supports supported at its opposite ends by the same and located adjacent the supports centrally about the centers thereof, the elongated spiral spring having between the supports at least a portion of its length permanently curved and deviating in transverse direction from the supporting axis, and a damping member mounted at a fixed distance from the supporting axis at least in the region where the elongated spiral spring is curved and being in permanent contact with the same so as to prevent during working compression further transverse bending of the spiral spring, whereby vibrations of the spring are damped.

An embodiment of the present invention consists mainly in a spiral spring arrangement including two spaced spring supports arranged facing each other and each having a center, the centers lying in the supporting axis of the supports, each of the supports having a central projection at least one of which is made of vibration-damping material extending toward the other support and having a peripheral groove thereon, at least one of the projections tapering toward the opposite support, an elongated spiral spring secured on the projections between the supports and having its opposite ends in the grooves, the elongated spiral spring having between the supports at least a portion of its length permanently curved and deviating in transverse direction from the supporting axis, and a damping member mounted at a fixed distance from the supporting axis at least in the region where the elongated spiral spring is curved and being in permanent contact with the same so as to prevent during working compression further transverse bending of the spiral spring, whereby vibrations of the spring are damped.

Figure 2:
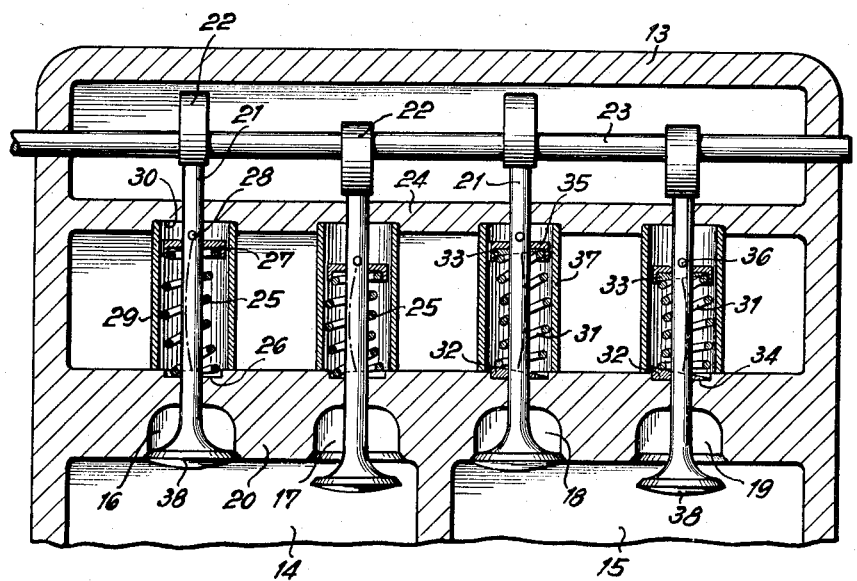

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a view in elevation of the spiral spring device according to the invention which is particularly adapted for use in a spring hammer; and Fig. 2 is a sectional view in elevation of a motor block showing spiral spring arrangements according to the invention associated with the engine valves.

Referring now to the drawings, and particularly to Fig. 1, numeral 1 designates a cylindrical housing surrounding the movable parts of a spring hammer device with which the spiral spring structure of the present invention is associated. Piston rod 3, driven by an actuating means not shown, is connected to cylindrical member 2 which closely fits in and slides longitudinally along the inner surface of cylindrical housing 1. Projecting downwardly from slide member 2 and arranged centrally thereof is a cylindrical projection 4 having a helical groove 5 arranged on the periphery thereof. Projection 4 may be formed of vibration-damping material, such as rubber, or resilient artificial plastics such as, for example, plastics of the polyvinyl, phenol, or formaldehyde groups.

Seated on projection 4 is spiral spring 6, the end of the latter having its coils engaging the spiral groove 5. The hammer 7 of the spring hammer device has a cylindrical form and is slidable within housing 1 in a manner similar to that of member 2 as above described, hammer 7 being adapted to strike against a tool (not shown) in response to the reciprocation of piston rod 3 and slide member 2 to which it is attached by the spiral spring 6. Hammer 7 has extending upwardly and centrally therefrom projection 8 which has a helical groove 9 formed on the periphery thereof similar to that of projection 4.

The lower end of spiral spring 6 is fitted onto and engages groove 9 on projection 8. Between its ends spiral spring 6 is provided with a curved portion in the region 12, so that the spring is in contact with housing 1 in said region. At the end of projection 8 the groove 9 is flared or enlarged as shown at 10 so that the spring coil which rests therein is freely movable during the longitudinal movement of spring 6. The effect of the enlarged end 10 of groove 9 is to provide for the spring coil to contact projection 8 at various places on the surface of groove end 10 during the up and down movement of the spring, thus constantly changing the effective length of the spring during longitudinal movement thereof.

By virtue of the above described construction, three features contributing to damping of vibrations set up in the spring by repeated compressive forces exerted thereon are provided. Firstly, the curved portion 12 of spring 6 being in contact with housing 1, the vibrations produced in the spring are absorbed or neutralized by the rubbing of the curved portion 12 against housing 1. Secondly, the vibration damping material of which projections 4 and 8 are made, as above described, further contributes to absorption of vibrations induced in the spring 6 by its rapid longitudinal oscillation. Thirdly, the tapering of projection 8 due to the enlargement of groove 9 toward the end 10 causes a change in the effective length of a spring thus neutralizing vibrations induced in the spring by its oscillation. Aside from such effective change in length of the spring, the attachment of the spring end in groove 9 as described above further affords protection for the spring in that a rigid connection between the spring and the hammer is thereby avoided which might result in breaking off of the spring at that point.

The curving of the spring 6 may be such that the ends thereof are aligned in one axis and only the middle portion thereof bent outwardly, as above described and as shown in Fig. 1, or the entire spring may be curved from one end to the other so that the ends of the spring are in a plane perpendicular to the axis of the spring, as shown, for example, in the spring 31 of Fig. 2.

Fig. 2 shows an embodiment of the device wherein the spiral spring structure according to the present invention is employed as a valve spring in an internal combustion motor. In the motor block 13 two cylinders 14 and 15 are shown which communicate with passages 16, 17, 18 and 19. The openings of these passages are adapted to be closed by valves 21, which are moved up and down by cams 22 of cam shaft 23. Between spaced walls 20 and 24 curved springs 25 are arranged connected to the valves of cylinder 14, the springs 25 acting to seat their respective valves in passages 16 and 17 and to urge them against cams 22. The springs 25 have curved longitudinal axes and have their ends arranged perpendicular to the axis of their respective valves, one end of spring 25 being arranged in a recess 26 in wall 20 and the other end of the spring being seated in a support 27 which is attached to valve 21 by a cross pin 28 and movable therewith. Housing 29 is arranged around a spring 25 so that the curved middle portion of spring 25 is in contact therewith. The housing 29 is secured between walls 20 and 24, the upper end of the housing being seated in recess 30 of wall 24.

The arrangement of the valve spring structure in cylinder 15 is similar to that described above with respect to cylinder 14, the springs 31 being curved along their length. In this case the ends of the spring are arranged perpendicular to the axis of the spring. The ends of the spring rest upon wedge elements 32 and 33 which are arranged at one end in recess 34 and at the other end in spring support 35.

It should be noted that in the form of the device shown in Fig. 1 wherein the spiral spring is incorporated in the spring hammer device, the spiral spring 6 has a curved form even when no compressive force is applied thereto. This curved form, therefore, would be provided in the spiral spring as an initial and permanent curvature. However, in the form of the device shown in Fig. 2, wherein the spiral spring serves as a valve spring which is always under some compression whether the valve is seated or not, the spring may be initially made to have a straight axis, and when it is installed as a valve spring as shown in Fig. 2 it may then be given its curved form under the compressive force to which it is subject in the open or closed position of the valve.

It will be understood that each of the elements described above, or two or more together, may also find a useful application in other types of spiral springs and vibration-damping means therefor differing from the types described above.

While the invention has been illustrated and described as embodied in a spring hammer device and in a valve spring arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A spiral spring arrangement comprising, in combination, two spaced spring supports arranged facing each other and each having a center, said centers lying in the supporting axis of said supports, each of said supports having a central projection extending toward the other support; an elongated spiral spring secured on said projections between said supports supported at its opposite ends by the same, said elongated spiral spring having between said supports at least a portion of its length permanently curved and deviating in transverse direction from said supporting axis; and a damping member in the form of a housing extending around said spiral spring and mounted at a fixed distance from said supporting axis at least in the region where said elongated spiral spring is curved and being in permanent contact with the same so as to prevent during working compression further transverse bending of said spiral spring, whereby vibrations of the spring are damped.

2. A spiral spring arrangement comprising, in combination, two spaced spring supports arranged facing each other and each having a center, said centers lying in the supporting axis of said supports, each of said supports having a central projection at least one of which is made of vibration-damping material extending toward the other support; an elongated spiral spring secured on said projections between said supports supported at its opposite ends by the same, said elongated spiral spring having between said supports at least a portion of its length permanently curved and deviating in transverse direction from said supporting axis; and a damping member in the form of a housing extending around said spiral spring and mounted at a fixed distance from said supporting axis at least in the region where said elongated spiral spring is curved and being in permanent contact with the same so as to prevent during working compression further transverse bending of said spiral spring, whereby vibrations of the spring are damped.

3. A spiral spring arrangement comprising, in combination, two spaced spring supports arranged facing each other and each having a center, said centers lying in the supporting axis of said supports, each of said supports having a central projection extending toward the other support and having a peripheral groove thereon; an elongated spiral spring secured on said projections between said supports and having its opposite ends in said grooves, said elongated spiral spring having between said supports at least a portion of its length permanently curved and deviating in transverse direction from said supporting axis; and a damping member in the form of a housing extending around said spiral spring and mounted at a fixed distance from said supporting axis at least in the region where said elongated spiral spring is curved and being in permanent contact with the same so as to prevent during working compression further transverse bending of said spiral spring, whereby vibrations of the spring are damped.

4. A spiral spring arrangement comprising, in combination, two spaced spring supports arranged facing each other and each having a center, said centers lying in the supporting axis of said supports, each of said supports having a central projection extending toward the other support and having a helical groove thereon, the width of at least one of said grooves, throughout at least that end portion thereof which is nearest the opposite support, flaring toward said opposite support; an elongated spiral spring secured on said projections between said supports and having its opposite ends in said grooves, said elongated spiral spring having between said supports at least a portion of its length permanently curved and deviating in transverse direction from said supporting axis; and a damping member in the form of a housing extending around said spiral spring and mounted at a fixed distance from said supporting axis at least in the region where said elongated spiral spring is curved and being in permanent contact with the same so as to prevent during working compression further transverse bending of said spiral spring, whereby vibrations of the spring are damped.

5. A spiral spring arrangement comprising, in combination, two spaced spring supports arranged facing each other and each having a center, said centers lying in the supporting axis of said supports, each of said supports having a central projection at least one of which is made of vibration-damping material extending toward the other support and having a helical groove thereon, the width of at least one of said grooves, throughout at least that end portion thereof which is nearest the opposite support, flaring toward said opposite support; an elongated spiral spring secured on said projections between said supports and having its opposite ends in said grooves, said elongated spiral spring having between said supports at least a portion of its length permanently curved and deviating in transverse direction from said supporting axis; and a damping member in the form of a housing extending around said spiral spring and mounted at a fixed distance from said supporting axis at least in the region where said elongated spiral spring is curved and being in permanent contact with the same so as to prevent during working compression further transverse bending of said spiral spring, whereby vibrations of the spring are damped.

6. A spiral spring arrangement comprising, in combination, two spaced spring supports arranged facing each other and each having a center, said centers lying in the supporting axis of said supports, each of said supports having a central projection at least one of which is made of vibration-damping material extending toward the other support and having a peripheral groove thereon; an elongated spiral spring secured on said projections between said supports and having its opposite ends in said grooves, said elongated spiral spring having between said supports at least a portion of its length permanently curved and deviating in transverse direction from said supporting axis; and a damping member in the form of a housing extending around said spiral spring and mounted at a fixed distance from said supporting axis at least in the region where said elongated spiral spring is curved and being in permanent contact with the same so as to prevent during working compression further transverse bending of said spiral spring, whereby vibrations of the spring are damped.

7. A spring-hammer arrangement comprising, in combination, an elongated housing; a driving member fitting in and slidable along the interior of said housing and having a spring supporting means projecting therefrom; a hammer member fitting in and slidable along the interior of said housing and having a spring supporting means projecting therefrom toward said spring supporting means of said driving member; and an elongated spiral spring extending between said members having its ends seated on said respective supporting means and having at least a portion of its length bent sideways and in contact with said housing whereby vibrations produced in said spring by repeated compression thereof during operation of said spring hammer are damped by said housing.

8. A spiral spring arrangement comprising, in combination, two spaced spring supports arranged facing each other and having a center, said centers lying in the supporting axis of said supports, each of said supports having a central projection extending toward the other support and having a helical groove therein, the width of at least one of said grooves, throughout at least that end portion thereof which is nearest the opposite support, flaring toward said opposite support; and an elongated spiral spring secured on said projections between said supports and having its opposite ends in said grooves, whereby vibrations of the spring caused by repeated compression thereof are damped by the constant change of length of said spring produced by the change of the point of contact of said spring, at the flaring groove portion, with the projecting portion having said one groove.

9. In a spring-hammer arrangement, in combination, a driving member mounted for reciprocating movement; two spaced spring supports arranged facing each other and having a center, said centers lying in the supporting axis of said supports, each of said supports having a central projection extending toward the other support and having a helical groove therein, the width of at least one of said grooves, throughout at least that end portion thereof which is nearest the opposite support, flaring toward said opposite support, one of said supports being connected to said driving member for reciprocating movement therewith; and an elongated spiral spring secured on said projections between said supports and having its opposite ends in said grooves, whereby vibrations of the spring caused by repeated compression thereof during reciprocation of said driving member are damped by the constant change of length of said spring produced by the change of the point of contact of said spring, at the flaring groove portion, with the projecting portion having said one groove.

References Cited in the file of this patent

UNITED STATES PATENTS

| | | |
|---|---|---|
| 303,033 | Miller | Aug. 5, 1884 |
| 354,672 | Barling | Dec. 21, 1886 |
| 2,356,940 | Marison | Aug. 29, 1944 |
| 2,365,826 | Landon | Dec. 26, 1944 |
| 2,380,218 | Claud-Mantle | July 10, 1945 |
| 2,389,056 | Jamison | Nov. 13, 1945 |
| 2,564,815 | Raymond | Aug. 21, 1951 |